Feb. 7, 1956

J. STERKEL 2,733,612

V-BELT SHEAVE

Filed Aug. 31, 1953

INVENTOR.
JACOB STERKEL
BY
ATTORNEY ation August 31, 1953, Serial No. 377,438

United States Patent Office 2,733,612
Patented Feb. 7, 1956

2,733,612
V-BELT SHEAVE
Jacob Sterkel, El Cajon, Calif.
Application August 31, 1953, Serial No. 377,438
1 Claim. (Cl. 74—230.5)

This invention relates to dual axle automotive vehicles of the type having a driving axle carrying drive wheels and an adjacent parallel idler axle carrying idler or load distributing wheels. Occasionally difficult road conditions will be encountered where the traction of the drive wheels is not sufficient to propel the vehicle. The principal object of this invention is to provide a simple and easily attached device which will act to temporarily convert the idler wheels into driving wheels so as to multiply the tractive effort of the vehicle under difficult road conditions.

Another object of the invention is to provide a device for the above purpose which can be applied to any standard vehicle without requiring any change in the vehicle or the wheels thereof and without requiring additional bolts or other attachment devices and without requiring any tools in addition to the usual wheel tools carried by the driver.

A further object is to provide means for enabling endless V-belts to be employed for vehicle wheel driving without danger of mud, snow, and other foreign materials packing between the belt and its pulleys or sheaves.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
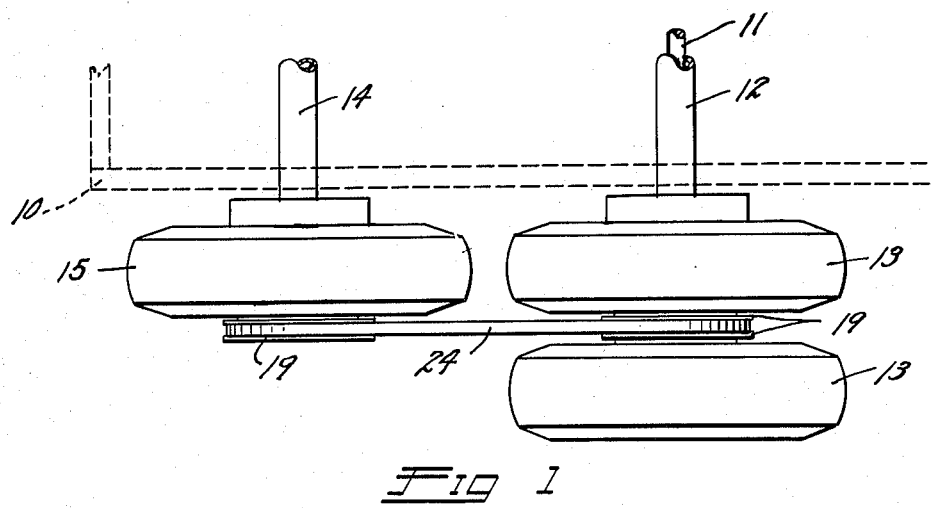
Fig. 1 is a diagrammatic plan view of the rear wheels at one side of an automotive vehicle of the type having drive wheels and idler wheels, illustrating the invention in place thereon.
Figure 2:
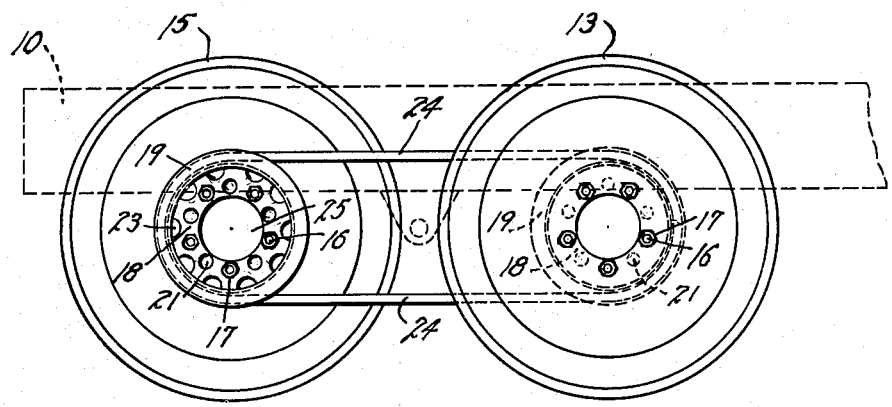
Fig. 2 is a side view of the wheels of Fig. 1.

In Fig. 1 the position of the chassis of an automotive vehicle is indicated in broken line at 10. A rear drive axle is indicated at 11, a rear axle housing at 12 and a pair of dual drive wheels at 13. The vehicle illustrated is also provided with a rear idler axle 14 having a single idler wheel 15 mounted at each extremity thereof.

It is to be understood that for the purposes of this invention, either axle could carry any desired number of wheels. The wheels are attached as usual by means of conventional, threaded wheel attachment studs 16 and wheel attachment nuts 17.

The invention comprises two simple elements, V-belt sheaves and endless V-belts 24. Preferably two V-belt sheaves are provided for each axle with two V-belts 24 so as to provide two sheaves and one belt for each side of the vehicle.

Figure 3:
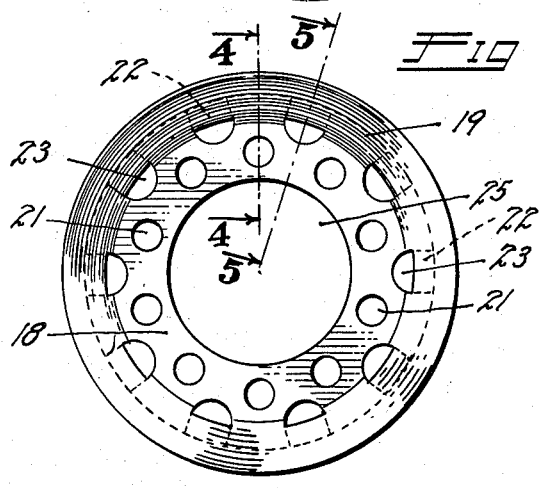
Fig. 3 is an enlarged face view of a V-belt disc employed in the invention.
Figures 4, 5:
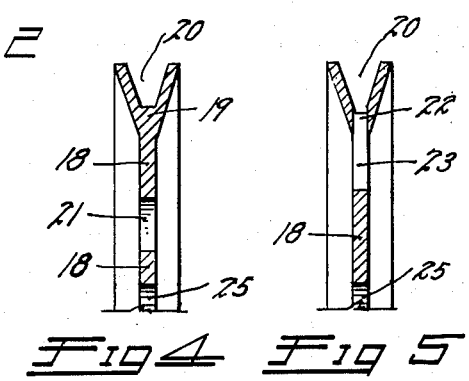
Fig. 4 is a still further enlarged, detail section through the rim of the pulley of Fig. 3, taken on the line 4—4, Fig. 3.
Fig. 5 is a similar enlarged section, taken on the line 5—5, Fig. 3.

The sheaves are duplicates and are illustrated in detail in Figs. 3, 4, and 5. Each sheaves comprises a flat, circular disc portion 18 provided with an axial hub opening 25 similar to the usual disc wheel. A flaring peripheral rim 19 provided with a V-belt groove 20 surrounds the circular disc portion 18. The disc portion 18 is provided with a circular series of stud holes 21, the diameter of the series corresponding to the standard wheel stud circle diameter of the conventional wheel hub studs 16. Some wheels are found to have five studs others ten. In view thereof the sheaves are provided with ten stud holes only five of which will be used on five stud wheels.

At intervals throughout the circumference of the V-belt groove 20, passages 22 are formed through the bottom of the groove and extend diametrically inward. The passages 22 communicate with discharge openings 23 extending completely through the disc portion 18 intermediate the bolt holes 21. The V-belts 24 are of conventional endless construction and of a size to snugly engage in the belt grooves 20.

To apply the V-belt sheaves to dual wheels, the outer dual wheel is removed and the disc portion 18 is forced inwardly over the wheel studs to a position against the inner dual wheel. The outer dual wheel is then placed in position and the nuts 17 are applied to secure the wheels in place and to clamp the V-belt sheave between the two wheels.

To apply the sheave to a single wheel, the wheel nuts 17 are removed and the disc portion 18 of the sheave is slid onto the wheel studs against the wheel. The nuts 17 are then replaced to securely lock the sheave in place against the wheel. Before placing the second sheave on either side of the vehicle, it is necessary that the V-belt be in place about both sheaves. The device is so easily applied and removed, that it can be carried as emergency equipment by the driver and only used when needed.

It can be readily seen that power will be transmitted via the V-belts from the drive wheels of the vehicle to the idler wheels thereof so that all of the rear wheels will act as traction wheels.

Should snow, mud and other foreign materials enter between the V-belts and the bottoms of the belt grooves 20, this material will be squeezed through the passages 22 and will discharge through the discharge openings 23 in the disc portion 18.

While a specific form of the improvement has been described and illustrated herein, it is desired to be understood that the same may be varied within the scope of the appended claim, without departing from the spirit of the invention.

Having thus described the invention, what is claimed and desired secured by Letters Patent is:

A V-belt sheave for use in providing a V-belt transmission for driving normally idle wheels of a vehicle from driving wheels thereof, said wheels being of the demountable type held in place by an annular series of threaded studs, comprising: a flat, circular disc portion having an axially-positioned hub opening adapted to be passed over a hub of one of said wheels; an annular V-belt-receiving portion surrounding said disc and projecting equally from both faces of said disc; a concentric series of stud holes in said disc positioned to receive the threaded studs of one of said wheels; a plurality of discharge openings extending transversely through said disc about the periphery thereof adjacent said V-belt-receiving portion; and a passage extending radially through said belt-receiving portion from each of said discharge openings.

References Cited in the file of this patent
UNITED STATES PATENTS

| 1,817,028 | Brockway | Aug. 4, 1931 |
| 1,862,770 | Sargent | June 14, 1932 |
| 2,139,622 | Louskey | Dec. 6, 1938 |
| 2,258,513 | Martinek | Oct. 7, 1941 |

FOREIGN PATENTS

| 993,858 | France | July 25, 1951 |